United States Patent [19]
Siminou

[11] Patent Number: 5,831,667
[45] Date of Patent: Nov. 3, 1998

[54] X-Y VIEWING TABLE AND ADAPTER FOR LOW VISION ENHANCEMENT SYSTEMS

[75] Inventor: Kamran Siminou, Newport Beach, Calif.

[73] Assignee: Enhanced Vision Systems, Costa Mesa, Calif.

[21] Appl. No.: 723,193

[22] Filed: Sep. 27, 1996

[51] Int. Cl.⁶ ............................................. H04N 7/18
[52] U.S. Cl. ...................................... 348/63; 348/53
[58] Field of Search ............................. 348/79, 62, 63, 348/53; 345/8; H04N 7/18

[56] References Cited

U.S. PATENT DOCUMENTS

| | | | |
|---|---|---|---|
| 3,704,378 | 11/1972 | Robb | 348/62 |
| 3,816,646 | 6/1974 | Cinque | 348/63 |
| 3,819,855 | 6/1974 | Rush | 348/63 |
| 4,115,813 | 9/1978 | Mikami | 348/63 |
| 5,060,062 | 10/1991 | Dotson | 348/62 |
| 5,151,722 | 9/1992 | Massof et al. . | |
| 5,159,927 | 11/1992 | Schmid | 348/62 |
| 5,359,675 | 10/1994 | Siwoff | 348/62 |

OTHER PUBLICATIONS

Visionics Corporation brochure entitled "A Brighter Picture A Fuller Life".
TeleSensory brochure regarding the "Alladin" personal reader.

*Primary Examiner*—Howard Britton
*Attorney, Agent, or Firm*—Lyon & Lyon LLP

[57] ABSTRACT

A vision enhancement system and improved X–Y viewing table. The vision enhancement system employs an X–Y viewing table that provides a mount for a video headset, the video headset, a monitor, and an image processing system. The video headset includes a camera and a video display system and is configured to detachably engage the mount provided on the X–Y viewing table. The image processing system has at least one port for communicating with the camera and video display system of the headset and another port for communicating with the monitor. An X–Y table in accordance with the present invention may comprise a base, a sliding tray coupled to the base for supporting an item, such as a book or newspaper, having one or more lines of text formed thereon, and a headset mounting unit coupled to the base. The mounting unit is configured such that a video headset may be detachably mounted thereon, and such that the video headset is maintained in a fixed position and at a selected distance over the tray.

4 Claims, 4 Drawing Sheets

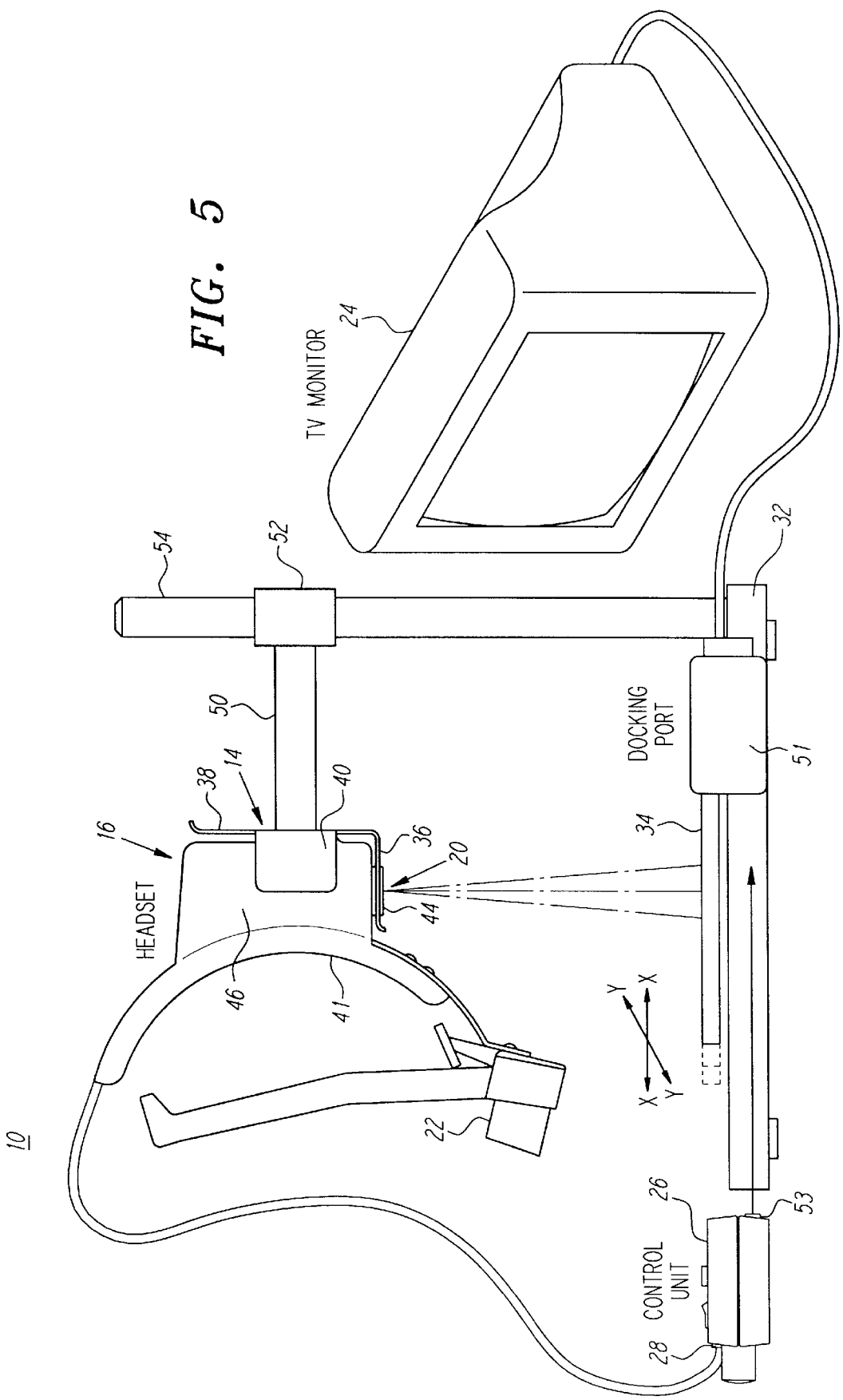

X-Y VIEWING TABLE AND ADAPTER FOR LOW VISION ENHANCEMENT SYSTEMS

BACKGROUND OF THE INVENTION

The present invention relates generally to low vision enhancement systems and, more particularly, to X-Y viewing tables for assisting persons with low vision to read.

The term "low vision" is often used by physicians and other health care providers to describe chronic vision problems that generally cannot be corrected through the use of glasses (or other lens devices), medication or surgery. Moreover, symptoms associated with low vision often result from a degeneration or deterioration of the retina of a patient's eye, a condition commonly referred to as macular degeneration. Other maladies producing symptoms of low vision include diabetic retinopathy, retinal pigmentosus and glaucoma.

An analogy often used to describe the effects of low vision or macular degeneration is the use of defective film in a camera. While the defective film may respond to some of the light which illuminates it, it is difficult, if not impossible, to produce clear and complete pictures using that film. Similarly, while the retina of the eye of a patient with low vision symptoms may respond in some areas to light, it is often difficult for the patient to make out small or far away objects and difficult for the patient to identify boundaries between areas of an image having similar colors.

Thus, to treat patients with low vision symptoms several vision enhancement systems have been developed. These systems generally include some type of video camera, an image processing system and a monitor of one kind or another. For example, one product now available for patients with low vision symptoms is an X-Y viewing table with a camera and associated monitor. A patient using such a table may place a book, newspaper or other document on the X-Y table and view enlarged portions of, for example, a page of the book on the monitor. In addition, the displayed image may be processed such that a sharp contrast is provided between the displayed letters or text and the image background, and such that a "reversed" image is displayed (i.e., white letters on a black background). Systems of this type are now available from Telesensory, Inc. of Mountain View, Calif.

In addition to X-Y viewing tables, several companies are now marketing portable, head mounted vision enhancement systems. For example, Visionics Corp. of Minneapolis, Minn., is currently offering a head mounted vision enhancement system for sale. The Visionics vision enhancement system includes a headset and an associated image processing system and battery pack. The headset resembles many of the "virtual reality" headsets that are available today and includes a video display system capable of providing a three dimensional, unmagnified view or a two dimensional, magnified view of an image picked up by a camera system mounted on the headset. Additionally, the image processing system provides the ability to enhance the "contrast" of the system and to generate "reversed" images, for example, to show white words on a black background.

Unfortunately, to take advantage of the benefits provided by both X-Y viewing tables and portable headset systems, it is presently necessary for a person with low vision symptoms to purchase both products. As both types of systems may cost several thousand dollars, it is easy to see that to achieve maximum benefits persons with low vision symptoms, or their insurers, must incur substantial expense. In addition, they must be familiar with and maintain two separate systems.

Accordingly, it is believed that those skilled in the art of vision assistance systems would find a single system capable of providing the advantages of both X-Y table viewing systems and headset based viewing systems to be quite useful and desirable.

SUMMARY OF THE INVENTION

The present invention is directed to a vision enhancement system that is capable of providing the advantages of both X-Y table viewing systems and headset based viewing systems. The present invention is also directed to a unique X-Y table adapter for use in such systems.

In one preferred form, a vision enhancement system in accordance with the present invention may comprise an X-Y table that provides a mount for a video headset, a video headset which includes a camera and a video display system and is configured to detachably engage the mount, a monitor, and an image processing system that has at least one port for communicating with the camera and video display system of the headset and another port for communicating with the monitor. Thus, it will be appreciated that a system in accordance with the present invention may provide all of the benefits associated with either headset or X-Y table based viewing systems, while incorporating a minimum number of components. It will also be appreciated that substantial savings in costs may be passed on to persons with low vision symptoms, or their insurers, through the use of vision enhancement systems in accordance with the present invention.

In another preferred form, the present invention is directed to an improved X-Y table. Moreover, an X-Y table in accordance with the present invention may comprise a base, a sliding tray coupled to the base for supporting an item, such as a book or newspaper, having one or more lines of text formed thereon, and a headset mounting unit coupled to the base. The mounting unit is configured such that a video headset may be detachably mounted thereon, and such that the video headset is maintained in a fixed position and at a selected distance over the tray. Thus, an X-Y table in accordance with the present invention provides a means for substituting the camera of a conventional headset based vision enhancement system for the camera of a conventional X-Y table based vision enhancement system, thereby creating a dual function vision enhancement system.

BRIEF DESCRIPTION OF THE DRAWINGS

FIG. 5 is an illustration of a vision enhancement system including a docking station in accordance with the present invention.

DESCRIPTION OF THE PREFERRED EMBODIMENTS

Figure 1:
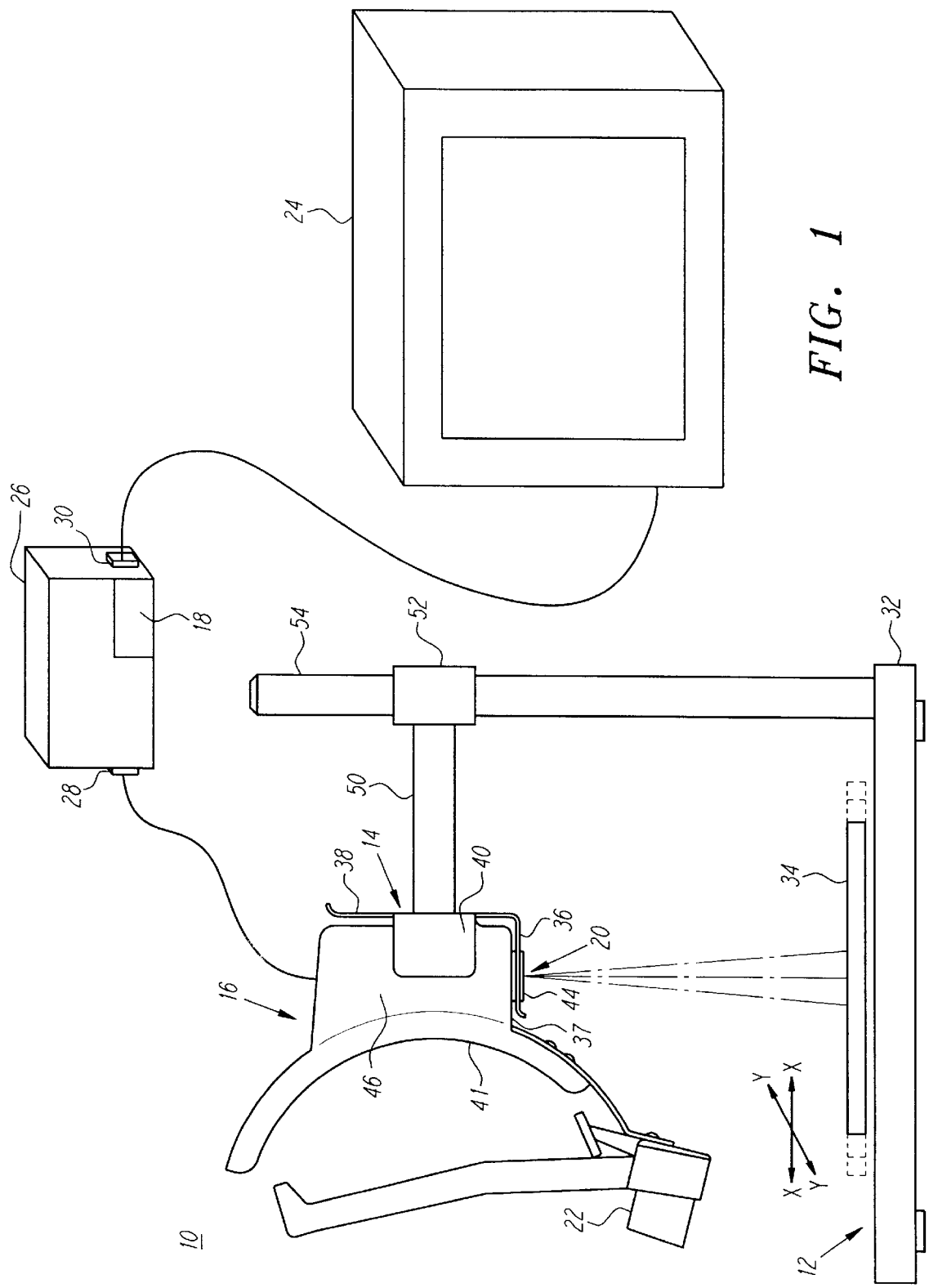
FIG. 1 is an illustration of one preferred embodiment of a vision enhancement system in accordance with the present invention.

Turning now to the drawings, FIG. 1 provides an illustration of a vision enhancement system 10 in accordance with one form of the present invention. As shown in FIG. 1, the vision enhancement system 10 of the present invention may comprise an X–Y table 12 that provides a mount 14 for a video headset 16, the video headset 16 which includes a camera 20 and a video display system 22, a monitor 24, and an image processing system 26 that has at least one port 28 for communicating with the camera 20 and video display system 22 of the headset 16 and another port 30 for communicating with the monitor 24. The image processing system 26 may be integrated with the camera 20 and video display system 22 of the headset 16, or it may comprise a separate unit integrated with a battery pack 18, as shown in FIG. 1. The headset 16 is configured to detachably engage the mount 14 provided on the X–Y table 12. Thus, when a person having low vision symptoms desires to read a book or some other text, the headset 16 may be deployed in the mount 14 and coupled to the monitor 24 via the image processing system 26, the text may be positioned on the X–Y table 12, and an image of the text may be depicted on the monitor 24. When the person has finished reading the text, the headset 16 may be removed from the mount 14 and the image processing system 26 uncoupled from the monitor 24, thus enabling the headset 16 and image processing system 26 to be used as any other portable vision assistance device.

Figure 3:
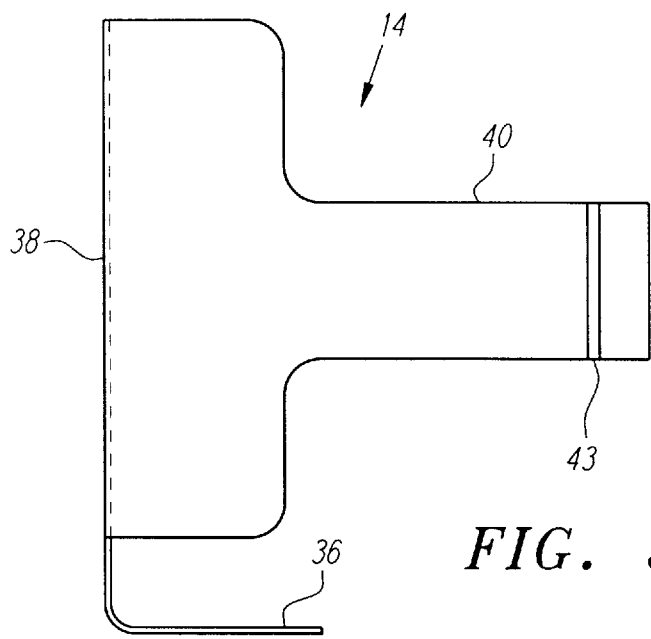
FIG. 3 is a side view of a video headset mount in accordance with one preferred form of the present invention.
Figure 4:
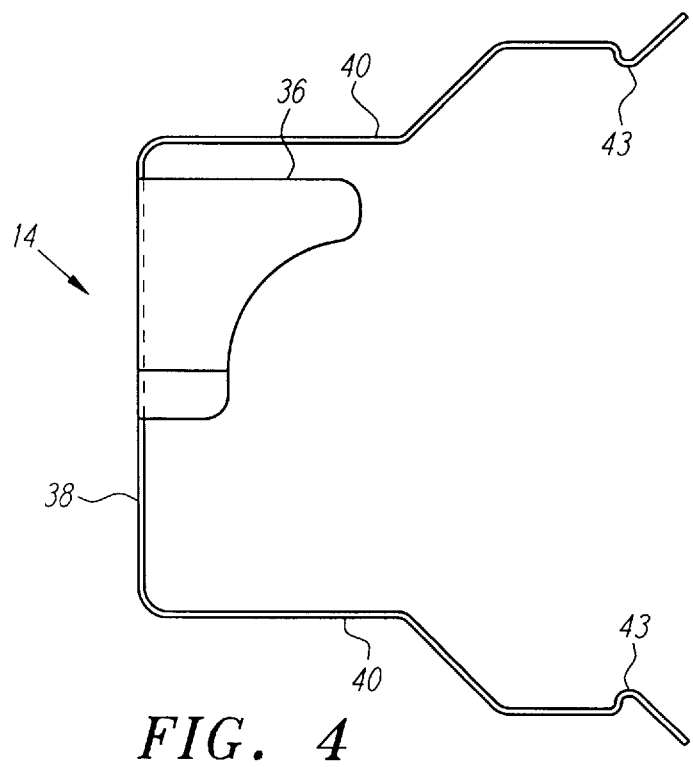
FIG. 4 is an elevational view of the video headset mount shown in FIG. 3.

As for the X–Y table 12 and mount 14, it is presently preferred that the X–Y table 12 comprise a base 32 and a tray 34 which is slideably attached to the base 12, and that the mount 14 be adapted to detachably receive a video headset 16. Further, as shown in FIGS. 3 and 4, the mount 14 may comprise a unitary piece of metal or plastic which includes a base support surface 36, a backing member 38 and two side flanges 40. The base support surface 36 may be sized and dimensioned such that it is capable of supporting a front surface 37 of the housing of the video headset 16, while at the same time allowing passage of the lens 44 of the camera 20 of the video headset 16. For example, the base support surface 36 may have a hole (not shown) or other aperture formed therein, such that the lens 44 of the camera 22 may pass therethrough, or the base support surface 36 may be contoured as shown in FIG. 4 to allow passage of the lens 44.

Figure 2:
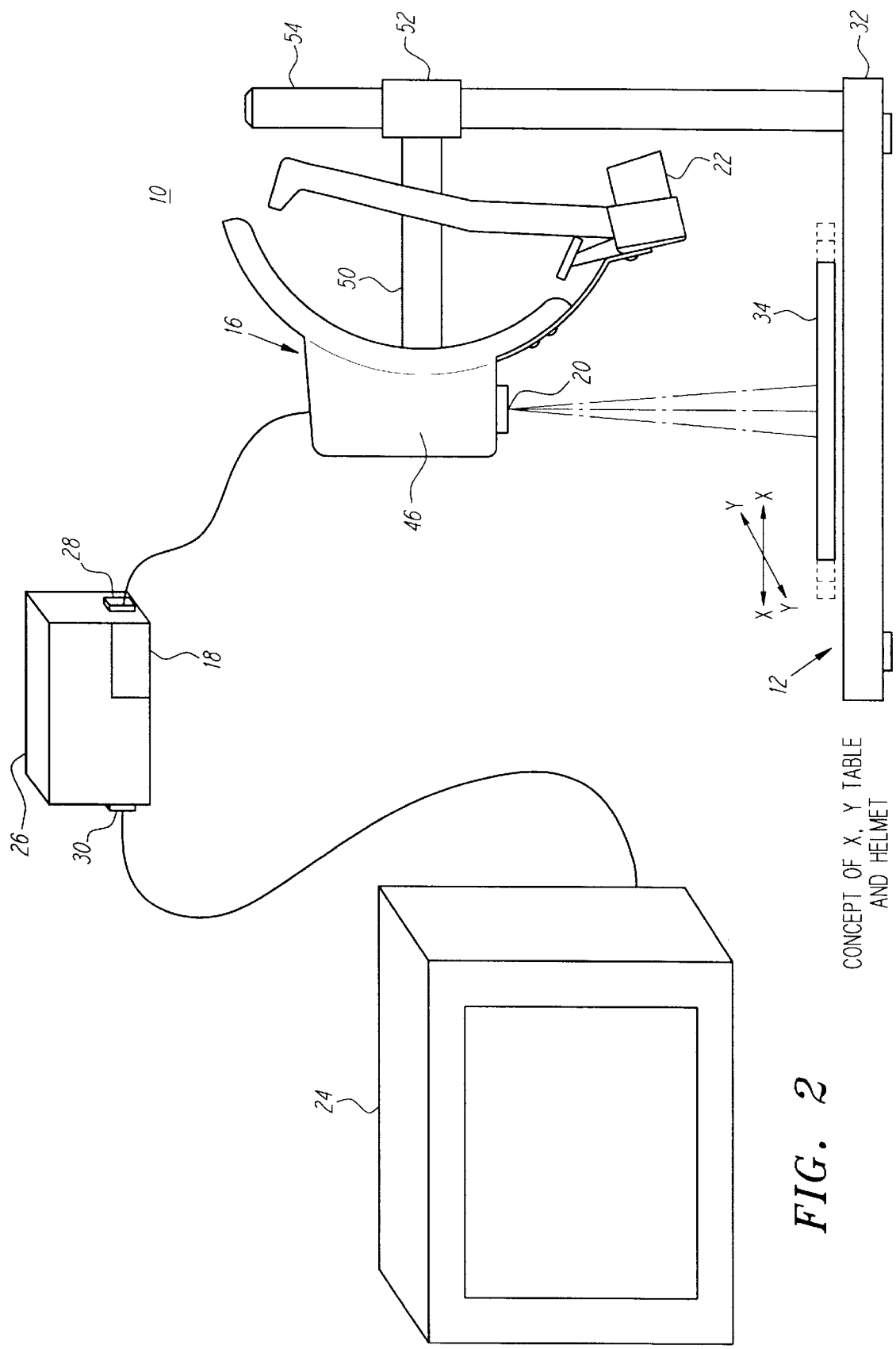
FIG. 2 is an illustration of a second preferred embodiment of a vision enhancement system in accordance with the present invention.

As further shown in FIGS. 3 and 4, the side flanges 40 may be configured so as to mate with and engage the exterior surface of the housing of the video headset 16. For example, the side flanges 40 may be configured to conform to the external surface of the housing of the video headset 16 and to detachably engage a bottom edge 41 of that surface. In the exemplary embodiment shown in FIGS. 3 and 4, an inward bend or fastening bend 43 is provided at the distal extremities of the side flanges 40. This fastening bend 43 enables the housing of the video headset 16 to be "snapped" into the mount 14. Alternatively, the side flanges 40 may each have an inner surface whereon a raised ridge (not shown) is provided, such that the side flanges 40 may detachably engage a pair of recesses (not shown) formed on external surfaces 46 of the headset 16. In either case, when the headset 16 is snapped into the mount 14, the headset 16 may be maintained in a fixed position relative to, and at a fixed distance from, an item placed on the tray 34 of the X–Y table 12. Finally, the backing member 46 may be fixed to a lateral support member 50 which has a sleeve member 52 formed at its distal end, the sleeve member 52 being adapted to slide over and engage a vertical support member 54 that is affixed to the base 32 of the X–Y table 12. Further, a screw or other fastening mechanism may be provided on the sleeve member 52 to enable the sleeve member 52 to detachably engage the vertical support member. Likewise a gear mechanism might be provided on the sleeve member 52 and a series of small slots provided on the vertical support member 54, such that the position of the sleeve member 52 might be adjusted by turning a dial or other rotating member. Those skilled in the art will appreciate that other mechanisms may also be used to detachably couple the headset 16 to the mount 14. For example, a latching mechanism or velcro might be used to detachably couple the headset 16 to the mount 14 or to some other type of vertical support member, and as shown in FIG. 2 the lateral support member 50 might be adapted to engage a surface (not shown) on the underside of the headset 16. Moreover, such alternatives would be considered to be equivalent to the engagement means described above.

Turning now to the video headset 16 and image processing system 26, the specific components and circuits used in those elements are not discussed herein, as it is believed that the structure, function and operation of those elements are well known in the art. Moreover, it will be appreciated that CCD cameras for use with the video headset 16 may be purchased, for example, from Toshiba, Hitachi, Panasonic or Sony, and that the video display system 22 utilized in the video headset 16 may be purchased, for example, from Virtual I/O, Inc., of Seattle, Wash., or Cyber Max, Inc., of Chicago Ill. Similarly, the image processing system 26 may be purchased, for example, from Enhanced Vision Systems, Inc., of Costa Mesa, Calif. It will be noted, however, that in one preferred embodiment the image processing system 26 may have at least one port 28 for communicating with the camera 20 and video display system 22 of the headset 16 and at least one port 30 for communicating with the monitor 24. Thus, when it is desired to use the headset 16 in conjunction with the X–Y table 12, the image processing system 26 may be easily coupled to the monitor 24 using, for example, a standard connector and cord.

Finally, turning to FIG. 5, in still another innovative aspect a docking station 51 may be provided which is designed to slideably engage the image processing system 26 and to provide electrical communication between the monitor 24 and the image processing system 26. Moreover, a power and communications port 53 may be provided on the casing of the image processing system 26 and adapted to mate with a corresponding port (not shown) provided within the docking station. Thus, when a user of the video headset 16 desires to use the X–Y table 12 and monitor 24, the video headset 16 may simply be snapped into the mount 14 and the image processing system 26 snapped into the docking station 51.

While the invention is susceptible to various modifications and alternative forms, specific examples thereof have been shown by way of example in the drawings and are herein described in detail. It should be understood, however, that the invention is not to be limited to the particular forms or methods disclosed, but to the contrary, the invention is to cover all modifications, equivalents, and alternatives falling within the spirit and scope of the appended claims.

What is claimed is:

1. A system for assisting persons with low vision symptoms, said system comprising:

an X–Y table, said X–Y table providing a mount for a video headset, a video headset including a camera and a video display system, said video headset being configured to detachably engage said mount, a monitor, and an image processing system coupled to said camera and video display system of said video headset and having at least one port for communicating with said monitor.

2. The system of claim 1, wherein
said video headset includes an external casing having a pair opposing co-planar surfaces, said opposing co-planar surfaces each having a linear recess formed therein, and
said mount of said X–Y table includes a pair of parallel opposing flanges which each have a linear protrusion formed thereon, said linear protrusions of said opposing flanges being adapted to detachably engage said linear recesses of formed within said opposing co-planar surface of said casing of said video headset.

3. An X–Y table for a vision enhancement system, said X–Y table comprising:
a base,
a tray slideably coupled to said base and adapted to slide in first and second orthogonal directions, and
a video headset mounting unit coupled to said base, said video headset mounting unit including a mount for detachably receiving a video headset and positioning said video headset in a prescribed position over said tray.

4. A system for assisting persons with low vision symptoms, said system comprising:
an X–Y table, said X–Y table providing a mount for a video headset,
a video headset including a camera and a video display system, said video headset being configured to detachably engage said mount,
a monitor,
a docking station having an electrical connection to said monitor, and
an image processing system having a first electrical connection for communicating with said camera and video display system of said video headset and having a second electrical connection for communicating with and receiving power from said docking station.

* * * * *